April 5, 1927.
P. BELL
1,623,774
HOLDING DEVICE FOR WILD ANIMALS
Filed June 24, 1926
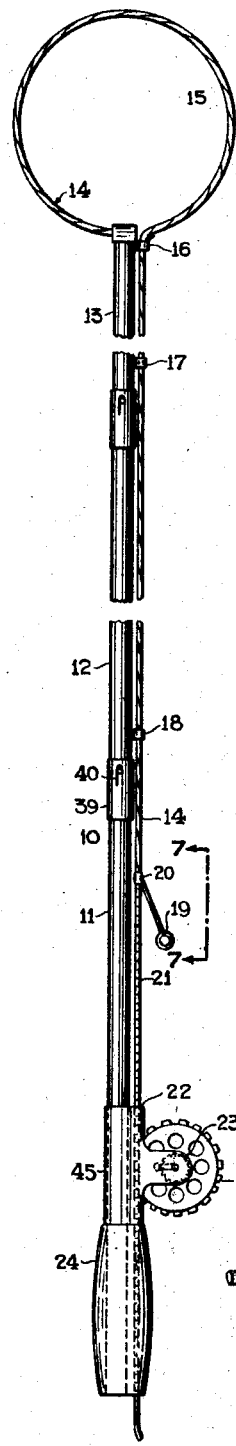
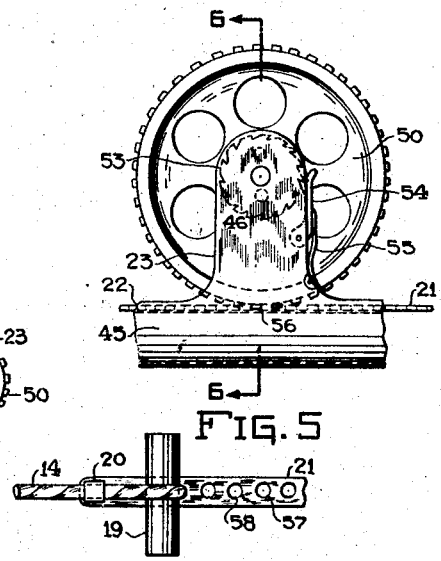
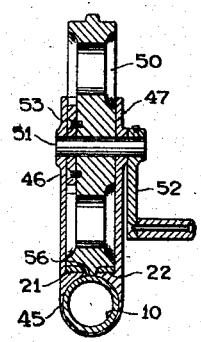
INVENTOR
Paul Bell
BY
ATTORNEY Patented Apr. 5, 1927.

1,623,774

UNITED STATES PATENT OFFICE.

PAUL BELL, OF MEXICO CITY, MEXICO.

HOLDING DEVICE FOR WILD ANIMALS.

Application filed June 24, 1926. Serial No. 118,205.

This invention relates to a holding device for wild animals, and its object is to provide a means for gripping portions of the bodies of such animals and enabling the hunter to control their movements while removing them from traps and the like.

The device may also be used to kill the animals by strangulation if so desired.

When strong and vicious animals, such as wolves and the like are caught in traps which do not kill them, it is usually necessary to shoot, or strike them down with a club or like implement before attempting their removal. This practice frequently results in great injury to the fur because of tears and abrasions thus incurred, and as the primary object of the catching of the animal is the sale of the said fur, this becomes a source of considerable loss to the trapper.

Snakes may be captured by the use of the holder and destroyed, or brought in alive, as may be desired.

Features of the invention, other than those specified, will be apparent from the hereinafter detailed description and claims, when read in conjunction with the accompanying drawings, in which:

Fig. 1 is a side view of the device, broken away at intervals to somewhat reduce the size of the figure.

Fig. 2 is an enlarged fragmentary view of a joint with the sleeve in open position.

Fig. 3 is a section on the line 3—3 of Figure 2.

Fig. 4 is a fragmentary view of a joint in folded position.

Fig. 5 is an enlarged side view of the retracting mechanism.

Fig. 6 is a section on the line 6—6 of Figure 5.

Fig. 7 is an enlarged fragmentary view of the hand grip and portions of the cable and the perforated strap within the limits of the line 7—7 of Figure 1.

Fig. 8 is a view of the device folded and placed within a carrying case which is indicated by dot and dash lines.

Referring more particularly to Figure 1 of the drawings, the principal elements of the device are as follows. A jointed rod 10 which may be of steel, or any suitable material either tubular, or solid, is formed of members as shown at 11, 12 and 13, and has secured at its upper extremity a cable 14 which is preferably of twisted wire. This cable is looped as shown at 15 and passes through a flanged guide as shown at 16. From thence it runs along the side of the rod through other guides as shown at 17 and 18 and has at its lower end a hand grip 19. Secured to the said cable as shown at 20 is a perforated metal strap 21 which extends downward through the channel 22 of the retracting element 23, which is secured to the base of the rod 10. Below the retracting element is a handle member 24.

The construction of the joints of the rod is illustrated in Figures 2 and 3, on reference to which it will be seen that end lugs 30 and 31 are secured within the ends of the tubes 11 and 12. These lugs are provided with side members 32, 33, 34 and 35 and are connected by means of the link plate 36 which is held by the pivots 37 and 38.

A sleeve 39 has near to its top end a snap tongue 40 which is formed by slitting the wall of the sleeve as shown at 41. It is provided with a perforation as shown at 42 which engages the stop pin 43 when the sleeve is pushed upward over the jointed portion. The tongue member may be of steel if preferred, in which case it is riveted on the adjacent wall of the sleeve.

The various parts of the retracting element are shown in Figures 5 and 6 and comprise a base member 45 with side frames 46 and 47, and a channel 22 which is grooved as shown at 48. Mounted within the side frames is a sprocket wheel 50 which is keyed to the shaft 51 and operated by the crank 52. Secured to the side of the sprocket 50 is a ratchet wheel 53 which engages the pawl 54. A spring 55 holds the said pawl in closed position. In operation, the sprocket teeth as shown at 56 engage the perforations of the strap 21 and draw it to the rear, thus closing in the loop portions of the cable.

The form of the perforations in the strap 21, is shown in Figure 7 of the drawings at 57, 58, etc.

The device may be folded for carrying and placed in a case as illustrated in Figure 8.

When set for use, the sleeves cover the joints as illustrated in Figure 1 and the rod is thus held straight and rigid.

To use, the loop is placed around the neck, or other portion of the animal's body and is drawn tight by means of the hand grip, or the retracting apparatus.

While I have shown the preferred embodiment of my invention, I do not wish to be held rigidly to the exact details of construction as illustrated, but claim the right to such minor modifications as may come within the scope of the appended claims.

Having thus described my invention, what I claim as new and desire to secure by Letters Patent, is as follows:

1. In a device of the class described, a jointed rod, means to secure the members thereof in straight and rigid alignment, a looped cable secured to one end of the said rod and passing through suitable guides thereon and having a perforated metallic strap affixed in elongation of the said cable and passing through the channel of a retracting element, where it is engaged by the teeth of a sprocket wheel which is mounted within the said element and is provided with a ratchet and pawl check mechanism for the control thereof.

2. In a device of the class described, a jointed rod and means to secure the same in rigid and straight formation, a cable secured at one end of the said rod and forming a loop adjacent thereto and extending from the said loop downward along the side of the said rod where it is guided by suitable supporting members, a hand grip at the termination of the said cable and a perforated strap secured to the said cable in proximity to the said hand grip, and the said strap passing through a channel in a retracting element which is secured to the base portion of the said rod, and a sprocket wheel mounted in the said retracting element and having its teeth engaging the perforations of the said strap, and means to check the backward rotation of the said sprocket wheel.

In testimony whereof I have affixed my signature.

PAUL BELL.